United States Patent [19]

Jih

[11] 4,251,799
[45] Feb. 17, 1981

[54] OPTICAL CHARACTER RECOGNITION USING BASELINE INFORMATION

[75] Inventor: Chentung R. Jih, San Jose, Calif.

[73] Assignee: International Business Machines Corporation, Armonk, N.Y.

[21] Appl. No.: 25,436

[22] Filed: Mar. 30, 1979

[51] Int. Cl.³ ............................................. G06K 9/32
[52] U.S. Cl. ...................... 340/146.3 H; 340/146.3 Y
[58] Field of Search ................ 340/146.3 H, 146.3 Y, 340/146.3 SY, 146.3 SG

[56] References Cited

U.S. PATENT DOCUMENTS

| | | | |
|---|---|---|---|
| 3,142,761 | 7/1964 | Rabinow | 340/146.3 H |
| 3,196,395 | 7/1965 | Clowes et al. | 340/146.3 Q |
| 3,221,302 | 11/1965 | Silverberg | 340/146.3 H |
| 3,231,860 | 1/1966 | Chatten | 340/146.3 H |
| 3,295,105 | 12/1966 | Gray et al. | 340/146.3 H |
| 3,350,505 | 10/1967 | Bakis | 340/146.3 H |
| 3,506,807 | 4/1970 | Malaby | 340/146.3 H |
| 3,509,415 | 4/1970 | Bartz | 340/146.3 H |
| 3,559,169 | 1/1971 | Gillmann et al. | 340/146.3 H |
| 3,587,047 | 6/1971 | Cutaia | 340/146.3 H |
| 3,727,184 | 4/1973 | Roza et al. | 340/146.3 H |
| 3,852,573 | 12/1974 | Dolch | 340/146.3 H |
| 4,013,999 | 3/1977 | Erwin et al. | 340/146.3 H |
| 4,028,674 | 6/1977 | Chuang | 340/146.3 SY |

OTHER PUBLICATIONS

Dutta, "Exp. Procedure for Handwritten Char. Rec.", *IEEE Trans. on Computers,* May, 1974, pp. 536-544.

*Primary Examiner*—Leo H. Boudreau
*Attorney, Agent, or Firm*—Walter J. Madden, Jr.

[57] ABSTRACT

An Optical Character Recognition (OCR) system for printed characters uses information about baseline location to assist in registration, segmentation, recognition and the separation of underscoring. Selected ones of the sensor elements in the OCR scanning array are identified as defining a baseline searching window and the outputs of these selected elements are utilized to detect baseline information for each character or group of characters in a printed line.

3 Claims, 4 Drawing Figures

OPTICAL CHARACTER RECOGNITION USING BASELINE INFORMATION

TECHNICAL FIELD

This invention relates in general to Optical Character Recognition (OCR) systems, and relates more particularly to systems which utilize information as to the baseline of a character or characters to aid in the registration and segmentation of characters and in the recognition process itself.

BACKGROUND ART

There are many types of character recognition systems known in the prior art. Typically in such systems, a scanning means such as a flying spot optical scanner scans a medium on which characters are stored and provides one type of output electrical signals in response to the scan of the character and another type of output electrical signal in response to a scan of the background. The character recognition logic receives the scanner output signals and makes a decision as to the character identity. As examples, optical scaners may distinguish black characters from white background, or vice versa, and magnetic scanners may distinguish between characters written with magnetic ink and the nonmagnetic background. Since the signals from the scanner output only inform the logic whether the scanner is instantaneously viewing a spot on the character or a spot on the background, it is necessary to provide position signals to the recognition logic. The position information supplied corresponds to the movement of the scanner.

The scanner usually performs a patterned scan which covers a certain area. In some systems, an entire line may be scanned, using a buffer for storing the information. In other systems, scanning occurs one vertical line of a character at a time. In these latter systems, the patterned scan of one character in a line is followed by the patterned scan of the next character in the line, and so on. When the scan reaches the end of a line it moves to the next line and begins again.

In an office environment, most documents are machine printed in single font style with a fixed pitch, usually on a typewriter. The documents have relatively good print quality and the text contains an inherent systematic grid pattern according to the fixed pitch and line spacing defined by the printing mechanism. Common baselines can be easily visualized from each line of printed characters. Baseline is defined as the bottom horizontal line to an uppercase X. The fixed pitch property has been widely used for segmentation, but baseline information has never been used or mentioned in the prior art. Segmentation refers to the separation of one character or mark from another, either vertically or horizontally, and registration refers to the positioning of the scanning device over the character or mark to be sensed. Possible reasons for this failure to use baseline information in OCR applications are:

1. Some OCR systems are designed for recognizing a line of characters with a special mark at the beginning. The mark is used to assist the OCR machine locate the characters and keep the line skew under control.
2. For some OCR applications, the spacing between lines of printed characters is big enough and/or no underscores and sub or super scripts are allowed in the text. Therefore, character images will never touch vertically with any other characters above or below.

Due to the intrinsic grid pattern existing on most office documents, segmentation may seem to be straightforward. However, it still has its own typical problems on line skew which may be generated originally in the printing process or caused by unaligned scanning, and problems on vertically touching images due to the presence of underscore and sub or super scripts. As to registration, the regular simple boxing technique, in which the OCR scanner is physically mounted to locate it over the center of a character, will not be able to properly register the character images with edge noise or with missing strokes. Besides, boxing registration loses character vertical position information which is quite important for character recognition on some font styles. Under these circumstances, baseline information is found to be very useful to handle these problems efficiently and effectively. Also, by using baseline information in accordance with this invention, the need for sophisticated line finding programs can be avoided for segmenting office-generated documents.

PRIOR ART

U.S. Pat. No. 3,196,395—A plurality of displaced images is produced and the degree of overlap of these images is monitored to decide upon the identity of the character by comparing the output of photoelectric detectors with known signal patterns.

U.S. Pat. No. 3,142,761—A line of characters is scanned with a row of photocells and the outputs of the photocells is monitored and furnished to servo control circuits for adjustment of the head scan.

U.S. Pat. No. 3,231,860—A rectangular raster is scanned for each character and sensed data is entered into a shift register. Each of the characters recognized is evaluated with respect to its position within the raster scan, and if the character is displaced from center, adjustments are made to the raster scan for the next character to center that character in the raster scan.

U.S. Pat. No. 3,221,302—A movable transducer is used to sense character data. The transducer is controlled by a stepper motor through control probes supplied to the motor and to a counting means. A programmed selection of pulses is used to position the transducer relative to the character data.

U.S. Pat. No. 3,587,047—A character recognition scanner in which the data for a line of characters is horizontally compressed and using the horizontally compressed data to vertically adjust the scanner.

None of the above references disclose the use of baseline information in any form for optical character recognition.

THE INVENTION

Depending upon the basic character font design, each character has a specific vertical position relative to a common writing line which can be directly converted to the baseline as defined. Most characters are located right on the baseline, for example, A, E, P, whereas some have portions extending below the baseline, for example, j, g, /, etc. In accordance with the present invention there are two ways to detect the imaginary baseline. The first, which may be called coarse prediction, involves making a horizontal projection density histogram of the scanned material. If such a histogram is made for every, say, 10 consecutive characters one end to the other, a peak usually is found at the lower portion of the histogram. That peak is a good estimate of the averaged baseline elevation for the associated group of characters. An averaged baseline for the entire print line can be similarly estimated from a total horizontal density histogram or by taking the average of the baseline estimates detected from each partial line histogram. The latter will also reveal some information about the skew of the line.

The second way to detect baseline may be called detail detection, and in this technique an imaginary window is allocated by assigning a section of a vertical linear sensor array to search for the baseline of each character image and the skew of a print line. For the first print line of a document, an estimated baseline is introduced manually by aligning the document to a horizontal reference, or it can be determined by the method of coarse prediction as described above. For the following print lines, the baseline can be directly estimated by adding the standard line spacing, say 1/6 inch, to the actual baseline measurement of the previous line. The scanner can be dynamically monitored so that it scans horizontally with the midpoint of the searching window following the estimated baseline. Therefore, the window will cover the neighborhood of the actual character baseline. The size of the window is related to the range of detectable baseline vertical offset to be expected. The lowest black bit in the searching window of each scan is recorded. The average of the lowest black bit position over a number of characters will be treated as the average baseline elevation for the associated characters. Averaging schemes can be utilized to minimize the error caused by characters with portions extending below the baseline. In addition to making the actual measurement on the fly as described above, the baseline searching process can also be conducted by buffering a line of scanned data and analyzing the data in the same way as described above.

One use to which information relative to baseline may be put is to measure the skew of a line. Piecewise baseline information across the entire print line will reveal the skew of that line. Such skew measurement is useful in enabling the OCR system to decide whether realignment of the document or pre-processing of the scanned data is required to correct any severe skew prior to further segmentation and registration. Additionally, the skew information will also assist in the following segmentation and registration.

Baseline information may also be used to define the domain for horizontal segmentation. Horizontal segmentation means the segmentation required to separate the horizontally neighboring characters printed on one line. Similarly, vertical segmentation is to separate a character from any images associated with the previous or the following print line. The presence of contiguous underscores will make the character image look as though it is touching its neighboring characters or make the normal character-touching features more complicated. It may be desirable to separate the underscore from the normal character field when the horizontal segmentation is taking place. In other words, referring to the standard 10-pitch Courier 72 font design, underscore is located at about 49 mils below the baseline. The baseline information can be utilized to define the domain for horizontal segmentation without interfering with any underscores of the present or the previous line.

A similar technique can be applied to locate the space for sub and super scripts separately.

The baseline information may also be used to assist vertical segmentation. Underscores can be detected directly from the vertical positional information provided by the baseline, so the underscore can be recognized in the pre-processing state prior to the recognition state. Thus, no special recognition logic is required for the underscores.

Due to ink splash or a poorly adjusted printing mechanism, the descending characters, for example, j, g, etc., and the tall characters, for example, /, f, etc. can easily touch the associated underscores or the underscores belonging to the previous line. Simple boxing techniques will not be able to do the segmentation and the following registration accurately. At this point, the baseline positional information is very useful. It can assist the OCR system in predicting where the underscore should be, to find out where the proper vertical segmentation should be and to filter out the attached underscore from the normal character image video, resulting in a clean, well segmented character image.

The baseline information also can be used to register a character image vertically. Since the baseline is determined from the detailed measurement of each individual character and the group properties of the whole print line, the baseline registration will be less sensitive to edge noise. Moreover, baseline registration will provide additional positional information which can be integrated into the recognition logic. For instance, such positional information is required to distinguish between an apostrophe and a comma which have the same shape for some fonts. Similarly, the video of some simple box-registered lowercase letters may not differ significantly from their corresponding uppercase video. In this situation, positional information would definitely help to distinguish the two.

The current averaged baseline position also allows the OCR system to predict where the next line should be according to the standard line-to-line distance, for example, six lines per inch. As a result of such prediction, the next baseline searching window can be properly located. The actual baseline measurement will then be used to update the prediction. Such interactive process makes the system capable of dealing with any cumulative error on the documents due to the line-to-line distance deviation from the standard.

DESCRIPTION OF THE BEST MODE AND INDUSTRIAL APPLICABILITY

Figure 1:
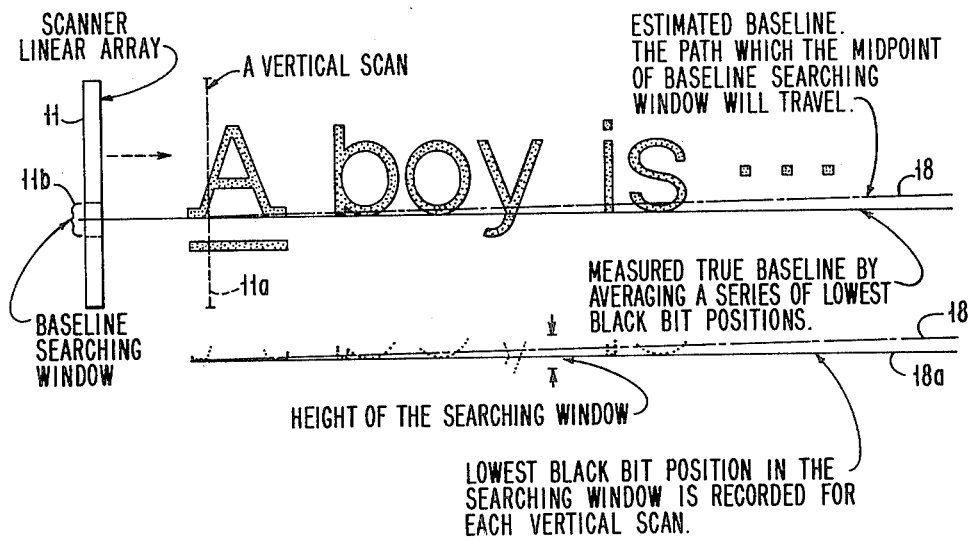
FIG. 1 is a diagram showing a scanner array and the baseline searching window of this invention in relation to a portion of a printed line to be scanned.

Referring to FIG. 1, a linear scanner array is shown schematically at 11 in relation to a portion of a line of print to be scanned. Array 11 may be of any suitable type used for optical character recognition such as a Reticon C Series Solid State Line Scanner, manufactured by Reticon Corp., Mt. View, Calif. As is well known, scanner 11 includes a suitable number, such as 64, of separate light sensitive elements arranged vertically of the line to be scanned. Each element in the array 11 produces an output signal which is a measure of the amount of light reflected from the portion of the scanned document associated with that element. The output signals from the elements of array 11 preferably are converted to signals indicating either a light or dark condition of the scanned area, and in the present description it will be assumed that signals from dark or printed areas of the scanned document will produce a binary "one" or black bit signal, while signals from light or background areas of the scanned document produce a binary "zero". Array 11 is arranged to perform a vertical scan which extends above and below the line to be scanned, as represented by 11a.

In accordance with the present invention, some of the sensor elements in array 11 are identified as a baseline searching window and their outputs are used in baseline identification. In FIG. 1, these elements forming the baseline searching window are identified as 11b and are located in the lower portion of array 11. For instance, in an array containing 64 sensor elements, 6 of these elements could be used for baseline searching. FIG. 1 will be discussed further in connection with detail baseline detection.

Figure 2:
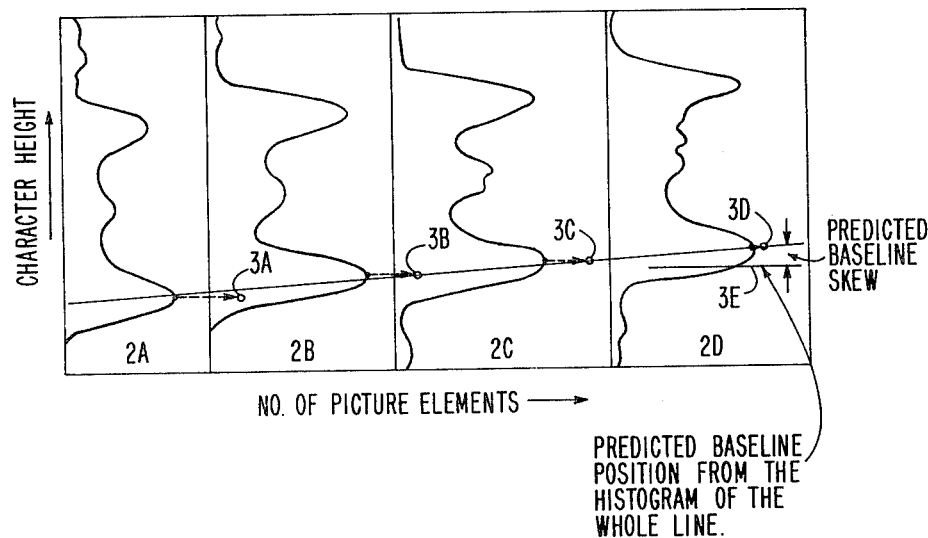
FIG. 2 is a series of histograms representing successive portions of the scanning of a printed line.

FIG. 2 illustrates the principles involved in performing a coarse baseline prediction in accordance with the present invention, FIG. 2 is a series of horizontal density histograms for a scanned line of characters, each separate frame 2A, 2B, 2C, 2D representing a consecutive scan of the same length across the line. Each frame contains a plot of the number of picture element signals received by the scanner as a function of character or line height. In accordance with this invention, the peak in the lower portion of the histogram is used as the predicted location of the baseline. Thus, for the histogram of frame 2A, point 3A represents the predicted baseline elevation, point 3B represents the predicted baseline elevation for frame 2B, etc. By averaging the histograms for the entire line, a predicted baseline for the entire line can be generated, as represented by line 3E in frame 2D, and the skew for the predicted baseline is represented by the difference between line 3E and the line connecting points 3A, 3B, 3C and 3D.

Figure 3:
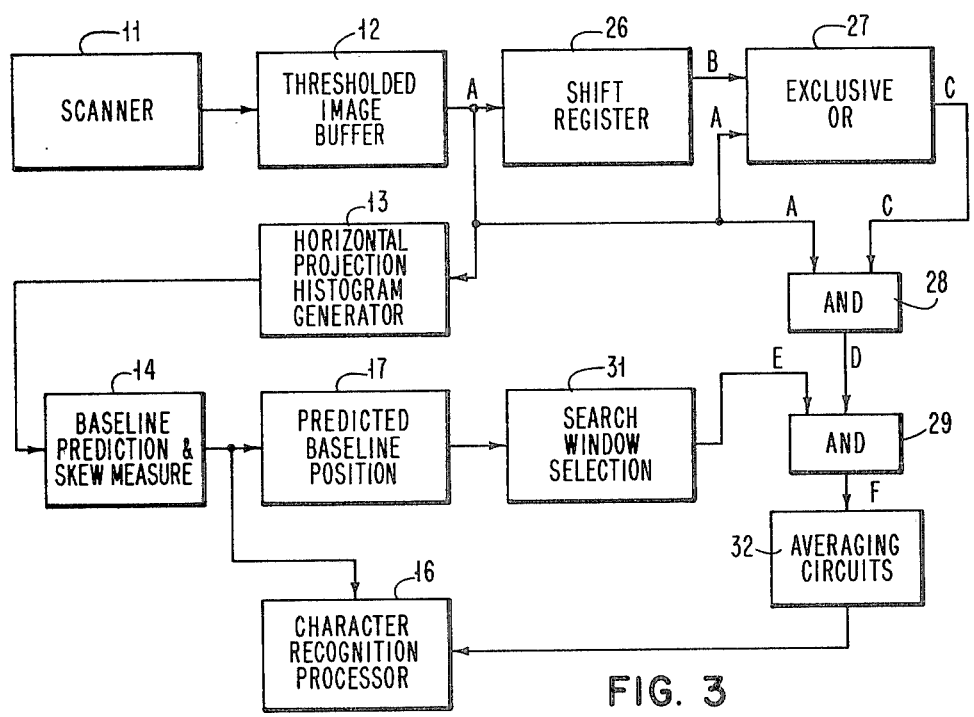
FIG. 3 is a block diagram illustrating circuitry for performing and utilizing both coarse and detail baseline position detection in accordance with this invention.

FIG. 3 illustrates circuitry for utilizing the coarse baseline prediction information in character recognition. The output from scanner 11 is supplied to a threshold buffer 12 which converts the signals from the sensors in array 11 to binary ones or zeroes corresponding to signals from dark or light areas of the scanned document, as discussed above. The output from buffer 12 is supplied as an input to a horizontal projection histogram generator 13, which is capable of measuring the signals from array 11 and generating a signal corresponding to the histograms of FIG. 2 indicative of the location of the peak value in each segment of a scanned line or the location of the peak value for the entire scanned line, or both. The output from generator 13 is supplied as the input to a baseline prediction and skew measurement network 14 which utilizes the signal from generator 13 to produce predicted values for the baseline location and a measure of the skew of the predicted baseline, as shown in FIG. 2. The output from network 14 is supplied as an input to a character recognition processor 16 which utilizes this information in a manner to be described below.

Detailed baseline detection may be understood by reference to FIG. 1 and the circuitry of FIG. 3. To initiate detailed baseline detection, searching window 11b is first aligned with the expected location of the baseline. This may be done by manually aligning searching window 11b with the estimated baseline position of the first character or characters in the line to be scanned. Alternatively, this location of the searching window can be performed utilizing the predicted baseline location determined by the histograms shown in FIG. 2 and the circuitry 13 and 14 of FIG. 3, as described above. In the latter case, network 14 will supply to a predicted baseline location generator 17 a measure of the predicted baseline location as determined by the histogram information obtained as illustrated in FIG. 2. This predicted baseline location is represented by the line 18 in FIG. 1.

After positioning the searching window at the predicted baseline location at the start of a line, scanning of the line by array 11 may commence along line 18. As the scanning proceeds, the lowest black bit position in the searching window 11b is recorded for each vertical scan. For the printed line shown in FIG. 1, which begins with "A Boy is . . . ", the lowest black dot position for each vertical scan is shown immediately below and represented by line 18a. In this connection, it will be seen in FIG. 1, that the lower portion of the letter "y" in "body" extends substantially below the predicted baseline 18, and would produce low black bit positions considerably below those of the surrounding letters. However, only the low black bit positions associated with the letter "y" which are within searching window 11b are recorded so that the line 18a representing these low black bit positions corresponds generally to the overall bottom positions of each letter on the line.

Circuitry for detecting the lowest black bit position is shown in FIG. 3 and includes a shift register 26 which receives the digitized scanner output signals from buffer 12. Shift register 26 operates to shift the bits in the buffer output one position and supply the shifted bits as one input B to an exclusive OR gate 27. Gate 27 receives the output of buffer 12 as another input A.

The output of gate 27 is supplied as one input C to an AND gate 28, gate 28 also receiving the input A from buffer 12. The output of gate 28 is supplied as an input D to an AND gate 29 which receives an input E from search window selection circuitry 31. Circuitry 31 is controlled by predicted baseline position generator 17 and operates to supply the equivalent of black position bits to gate 29 during the period of each vertical scan when the outputs of the sensor elements in array 11 identified as the searching window are being received. The output F of gate 29 is supplied to an averaging circuit 32 which operates to average the lowest black bit position information for each scanned line or portion thereof and supply this averaged position information to OCR processor 16. Segmentation, registration and recognition of character images will then take place in the OCR processor 16.

Figure 4:
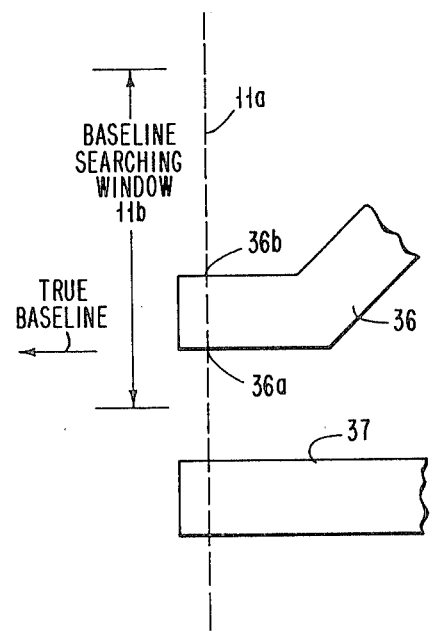
FIG. 4 illustrates output signals from the circuitry of FIG. 3 when scanning a portion of the printed line of FIG. 1.

The operation of the detail baseline detection and its ability to separate underscoring from characters is shown in FIG. 4 in relation to scanning the line shown in FIG. 1. In FIG. 4, reference 36 identifies the lower left leg of the letter "A" in "A Boy is . . . " shown in FIG. 1, and 37 identifies the underscoring which is under the "A" in this line. The positions of the sensor elements in array 11 are represented by the numbers 1–64 in the left hand column, only sensors 1–10 and 64 being shown to reduce the size of the figure. The outputs representing the signals A–F of FIG. 3 are shown in correspondingly labelled columns of FIG. 4.

The position of baseline searching window 11b is shown in FIG. 4 and it can be seen that this window corresponds to the positions of sensor elements 5–10 in array 11. The signals in the different columns A–F correspond to their values when scanner array 11 is at the position represented by line 11a in FIG. 4. In column A it will be seen that black bits are produced by sensor elements 6 and 7, representing the leg portion of the 36 of the letter "A", and by sensor elements 2 and 3, representing the underscoring 37 beneath leg 36. The signals of column A are supplied to shift register 26 of FIG. 3 which operates to shift the signals left or up one position, as shown by the arrows.

The signals represented by column B are supplied to exclusive OR gate 27 along with the signals A from buffer 12. The output of gate 27 is represented by column C in FIG. 4, containing bits in sensor element positions 2, 4, 6 and 8. This output C is then supplied to AND gate 28 along with signal A from buffer 12 to produce the signals shown in column D, having bits at positions 2 and 6.

Signals D are supplied to AND gate 29 along with signals E from search window selection circuitry 31. Since the baseline searching window in this example is assumed to extend across sensor elements 5–10, circuitry 31 generates bits in positions 5–10 as shown in column E. The output F from gate 29 contains a single bit at sensor position 6 and it will be seen that this corresponds to the location of the bottom of leg 36 and hence represents the true baseline for leg 36 and letter "A".

From FIG. 4 it can be seen that the present invention operates to detect and locate the transition 36a from black to white on the lower portion of leg 36 and disregards the transition 36b from white to dark on the upper portion of leg 36. Similarly, it can be seen that by narrowing the baseline search window to exclude underscoring 37, the true baseline is detected rather than obtaining an indication that underscoring 37 represented the location of the baseline. Further, it will be appreciated that by distinguishing between the character and its associated underscoring, the present invention allows the character itself to be presented to the recognition processor with or without the associated underscoring.

I claim:

1. A method for processing image data from a scanning array which scans characters in a scanning direction to locate a baseline, comprising the steps of calculating a horizontal projection histogram of said characters at a plurality of periodic spaced locations along said scanning direction, detecting a peak characteristic of each of said histograms, and averaging said detected peak characterstics of said histograms to produce an estimate of the skew of said baseline with respect to said scanning direction.

2. The method in accordance with claim 1 including the step of utilizing said estimated baseline data to dynamically alter said scanning array so that said scanning array follows said estimated baseline to process the character image data.

3. The method in accordance with claim 1, in which a histogram is calculated for each scanned character.

* * * * *